(12) United States Patent
Liu

(10) Patent No.: US 6,411,051 B1
(45) Date of Patent: Jun. 25, 2002

(54) APPARATUS FOR MONITORING THE ADHESION OF AN ELECTRIC RAIL VEHICLE SET

(75) Inventor: Rong Fan Liu, Pau (FR)

(73) Assignee: Alstom, Paris (FR)

( * ) Notice: Subject to any disclaimer, the term of this patent is extended or adjusted under 35 U.S.C. 154(b) by 0 days.

(21) Appl. No.: 09/523,187

(22) Filed: Mar. 10, 2000

(30) Foreign Application Priority Data

Mar. 11, 1999 (FR) .............................. 99 03014

(51) Int. Cl.⁷ .............................................. H02K 17/32
(52) U.S. Cl. .................... 318/434; 318/52; 318/432; 318/560; 318/802; 318/807; 318/811
(58) Field of Search ......................... 318/52, 432, 434, 318/807, 802, 811; 180/197; 364/426

(56) References Cited

U.S. PATENT DOCUMENTS

| | | | | |
|---|---|---|---|---|
| 3,764,867 A | * | 10/1973 | Smith ........................... | 318/52 |
| 4,035,698 A | * | 7/1977 | Soderberg ..................... | 318/52 |
| 4,075,538 A | * | 2/1978 | Plunkett ....................... | 318/52 |
| 4,136,303 A | * | 1/1979 | Almquist et al. ............. | 318/52 |
| 4,315,203 A | * | 2/1982 | Ibamoto et al. ............. | 318/807 |
| 4,327,313 A | * | 4/1982 | Tsuboi et al. ................. | 318/52 |
| 4,335,337 A | * | 6/1982 | Okamatsu et al. ............ | 318/52 |
| 4,686,434 A | * | 8/1987 | Kojima et al. ................ | 318/52 |
| 4,944,539 A | * | 7/1990 | Kumar et al. ................. | 291/2 |
| 5,289,093 A | * | 2/1994 | Jobard ......................... | 318/434 |
| 5,436,538 A | * | 7/1995 | Garvey et al. ................ | 318/52 |
| 5,480,220 A | * | 1/1996 | Kumar ........................ | 303/151 |
| 5,544,057 A | * | 8/1996 | Matsuoka .............. | 364/426.05 |
| 5,629,567 A | * | 5/1997 | Kumar .......................... | 290/3 |
| 5,708,334 A | * | 1/1998 | Schreiber et al. ........... | 318/432 |
| 5,847,534 A | * | 12/1998 | Tanamachi et al. ......... | 318/201 |
| 6,012,011 A | * | 1/2000 | Johnson ....................... | 701/82 |
| 6,020,714 A | * | 2/2000 | Ehrler et al. ................ | 318/807 |
| 6,028,402 A | * | 2/2000 | Kumar et al. ................. | 318/52 |

FOREIGN PATENT DOCUMENTS

| | | |
|---|---|---|
| DE | 44 02 152 C1 | 4/1995 |
| DE | 195 48 286 C1 | 3/1997 |
| DE | 195 39 652 A1 | 4/1997 |
| EP | 0 427 138 A1 | 5/1991 |

* cited by examiner

Primary Examiner—Robert E. Nappi
Assistant Examiner—Tyrone Smith
(74) Attorney, Agent, or Firm—Sughrue Mion, PLLC

(57) ABSTRACT

This monitoring apparatus for monitoring the adhesion of a motive power unit of an electric rail vehicle set comprises a power control stage for controlling the power supplied to the motor of the motive power unit, and an adhesion monitoring stage proper delivering to the power control stage a reference signal generated on the basis of at least one operating characteristic of the motor so as to keep the slip of the wheels of the motive power unit under control. The apparatus further comprises means for generating an activation signal for activating the monitoring apparatus and means for injecting the activation signal into the reference signal so as to cause it to deliver a modified reference signal.

10 Claims, 3 Drawing Sheets

APPARATUS FOR MONITORING THE ADHESION OF AN ELECTRIC RAIL VEHICLE SET

The present invention relates to monitoring apparatus for monitoring the adhesion of a motive power unit of an electric rail vehicle set, and it also relates to a power supply system for powering a motive power unit incorporating such adhesion monitoring apparatus.

BACKGROUND OF THE INVENTION

In the state of the art, in order for the drive power transmitted to the driving wheels of the rail vehicle to be compatible with the adhesion of said wheels, the motive power unit of the vehicle is generally provided with adhesion monitoring apparatus.

Such apparatus conventionally comprises a power control stage for the motor of the motive power unit, and an adhesion monitoring stage which proivides the power control stage with a reference signal that is generated on the basis of at least one operating characteristic of the motor, so as to keep under control, i.e. so as to reduce or even eliminate, wheel spin on the motive power unit.

Such apparatus makes it possible to reduce or even eliminate any commencement of wheel spin, in particular when the vehicle starts moving.

Unfortunately, such apparatus suffers from drawbacks, in particular because it can enable the wheels to slip too much on the rail and give rise to momentary loss of adhesion.

OBJECTS AND SUMMARY OF THE INVENTION

An object of the invention is to mitigate that drawback.

To this end, the invention provides monitoring apparatus for monitoring the adhesion of a motive power unit of an electric rail vehicle set, which apparatus comprises a power control stage for controlling the power supplied to the motor of the motive power unit, an adhesion monitoring stage for delivering to the power control stage a reference signal generated on the basis of at least a first operating characteristic of the motor so as to keep the slip of the wheels of the motive power unit under control, and further comprising means for generating an activation signal for activating the monitoring apparatus and means for injecting the activation signal into the reference signal so as to cause it to deliver a modified reference signal, wherein said means for generating the activation signal include means for measuring a second operating characteristic of the motor and means for detecting the direction in which said second characteristic varies between two preceding successive activations so as to determine the sign of the activation signal injected into the reference signal on the next excitation.

It is thus possible to transmit maximum torque to the driving wheels continuously.

The monitoring apparatus of the invention may also have one or more of the following characteristics, taken in isolation or in any technically possible combination:

- with the reference signal being generated on the basis of a third characteristic magnitude of the operation of the motor, the activation stage includes comparator means for comparing the value of said third characteristic with a predetermined threshold value, said means for generating the activation signal causing the amplitude of the activation signal to vary correspondingly as a function of the result of said comparison;

- the reference signal is a motor torque reference signal;
- the first characteristic is generated on the basis of a measurement of the acceleration of the motor;
- the second characteristic is generated on the basis of a measurement of the motor torque; and
- the third characteristic is generated on the basis of a measurement of the acceleration of the motor.

The invention also provides a control system for controlling the power supplied to a motor of a motive power unit of an electric rail vehicle set, said control system comprising a power supply circuit for supplying electrical power to the motor, said system further comprising apparatus as defined above for monitoring the adhesion of the motive power unit.

BRIEF DESCRIPTION OF THE DRAWINGS

Other characteristics and advantages appear from the following description given merely by way of non-limiting example and with reference to the accompanying drawings, in which.

MORE DETAILED DESCRIPTION

Figure 1:
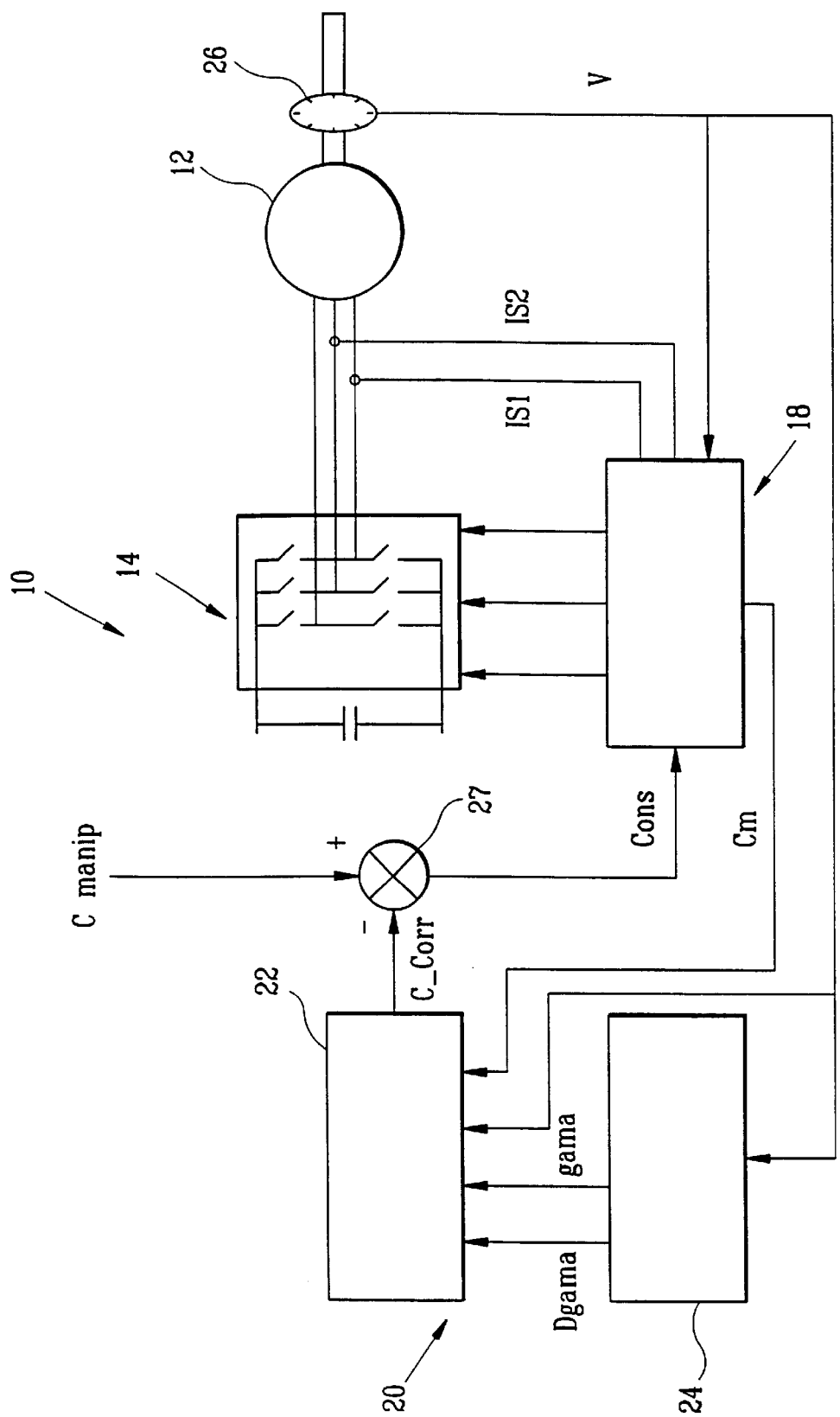
FIG. 1 is a diagram summarizing the structure of a power control system of the invention for controlling the power supplied to a motive power unit.

FIG. 1 shows the general structure of a power control system 10 for controlling the power supplied to a motor 12 of a motive power unit of an electric rail vehicle set.

The motor 12 is powered with electrical power by a power source 14 under the control of a power control stage 18 for controlling the power supplied to the motor 12.

It should be noted that the power control stage 18 is made up of elements of conventional type and suitable for the use considered, i.e. suitable for regulating the torque of the motor 12 around a value at which the motor is authorized to operate, on the basis of a reference signal Cmanip. The power control stage is therefore not described in detail below.

In the invention, the system is provided with adhesion monitoring apparatus 20.

This apparatus, which incorporates the power control stage 18, further includes an adhesion monitoring stage 22 proper that delivers a reference signal to the power control stage 18 so as to enable maximum torque to be transmitted to the driving wheels.

As shown in FIG. 1, the adhesion monitoring stage 22 receives, as input, signals corresponding to characteristics representative of the operation of the motor 12, which signals are delivered by a processing stage 24 on the basis of a signal V indicating a measurement of the speed of rotation of the motor 12, which signal is delivered by a suitable sensor 26.

More particularly, the processing unit 24 delivers a signal gama corresponding to the acceleration of the motor 12 and a signal Dgama corresponding to the derivative over time of the acceleration of the motor 12, which signal Dgama is used to increase the reactivity of the apparatus.

The adhesion monitoring unit 22 also receives the message signal V indicating the speed of rotation of the motor and a signal Cm corresponding to the value of the estimated electromagnetic torque of the motor 12, which signal is delivered by the power control stage 18 which receives, as input, both the measurement signal V indicating a measurement of the speed of rotation of the motor and delivered by the sensor 26, and also measurement signals IS1 and IS2 indicating measurements of the power current supplied to the motor 12 when the motor is a three-phase motor, a single current measurement being sufficient when the motor is a DC motor.

On the basis of the acceleration of the motor gama, of the derivative Dgama of the acceleration, and of the value Cm of the estimated torque of the motor 12, the adhesion monitoring stage 22 generates an activation signal C_Corr for activating the adhesion monitoring apparatus so as to cause it to deliver a modified reference signal.

The activation signal C_Corr is constituted by a signal delivered as input to a subtractor 27 so as to subtract it from the reference signal Cmanip. in order to generate the reference signal Cons presented as input to the control stage 18.

As is understandable, the activation signal C_Corr causes a shift in the reference signal Cons relative to the reference output by the controller.

An embodiment of the adhesion monitoring stage 22 is described in detail below with reference to FIG. 2.

This stage includes firstly a first portion 22a suitable for shaping the activation signal C_Corr, and in particular for calculating the amplitude of this signal, and a second portion 22b making it possible to determine the sign of the signal C_corr. As shown in FIG. 2, the first portion 22a includes storage means 28 for storing the absolute value of the maximum value of the acceleration gama between two consecutive activations.

The storage means 28 are connected at their outlet to a comparator 30 which compares the stored value with a maximum threshold value $gama_{max}$.

The output of the comparator is delivered as input to a shaping circuit 32 suitable for increasing the amplitude of the activation signal C_Corr relative to the amplitude of the preceding activation signal whenever the value stored in the storage means is less than the threshold value $gama_{max}$, and for reducing said amplitude whenever the opposite applies.

The second portion 22b of the adhesion monitoring stage 22 receives, as input, the signal Cm corresponding to the estimated value of the electromagnetic torque of the motor 12 and detects the direction in which the electromagnetic torque varies between two successive excitations.

To this end, said second portion 22b is provided with storage means 34 for storing the electromagnetic torque Cm(n−1) corresponding to the preceding activation and a comparator 26 for comparing the electromagnetic torques Cm(n) and Cm(n−1) of the two preceding consecutive activations.

The outlet of the comparator 36 is connected to a filter 38 that shapes the output of the comparator 36 so as to make it possible to control a bistable gate 40 in a manner such as to change the sign of the activation signal when a reduction in the electromagnetic torque has been detected, and such as to maintain the sign of the activation signal unchanged when an increase in said torque has been detected.

Figure 2:
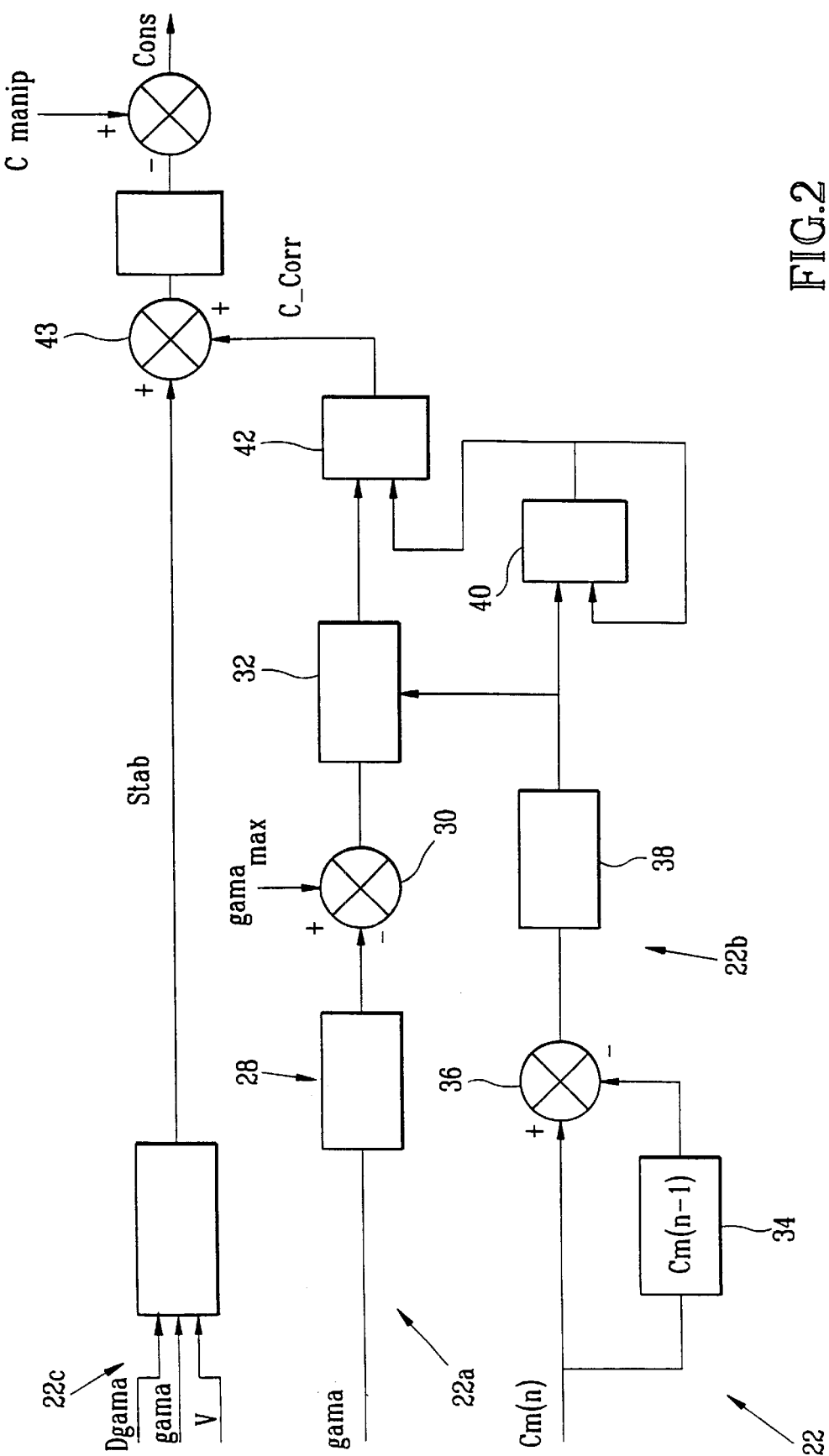
FIG. 2 is a diagram summarizing the structure of adhesion monitoring apparatus of the invention.

As shown in FIG. 2, the outlets of the first and second portions 22a and 22b are connected to a multiplier circuit 42 which delivers, as output, the activation signal C_Corr injected into the reference signal by means of the adder 27. On the basis of the signals gama, Dgama, and V, a stabilization third stage 22c delivers a stabilization signal Stab making it possible to stabilize the system on a point of equilibrium in which the motor torque is equal to the torque transmitted to the rail, which signal Stab is injected into the signal C_Corr by an adder 43.

The adder 43 is connected to a filtering circuit 44 for limiting the resulting signal so that it does not exceed the value of the reference signal Cmanip.

The operation of the above-described monitoring apparatus is illustrated below with reference to FIGS. 3 and 4 which show respectively how the motor torque Cm (curve I) and the force transmitted to the wheel rim Ct (curve II) vary as a function of slip G, and how the reference signal Cons, the motor acceleration gama, and the slip G vary as a function of time t.

Figure 3:
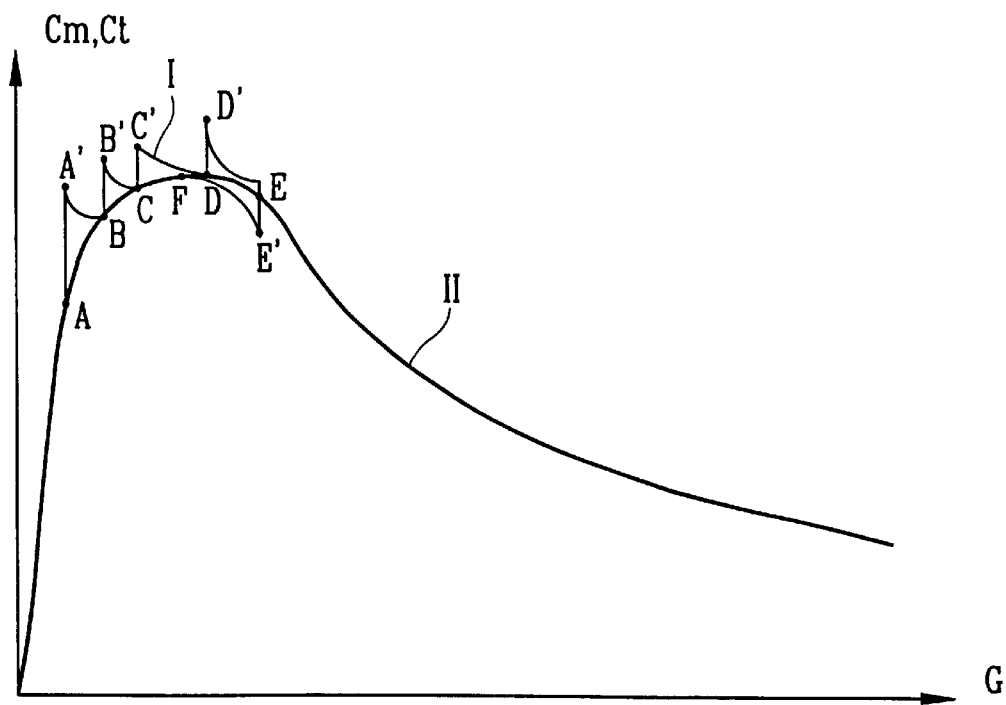
FIG. 3 is a curve showing how the force transmitted to the driving wheels varies as a function of slip.
Figure 4:
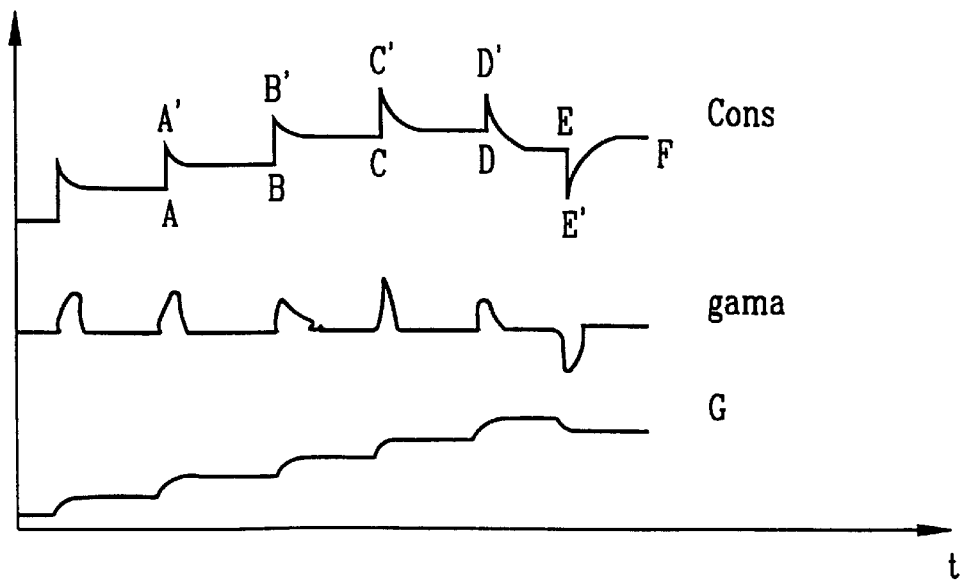
FIG. 4 gives curves showing how the reference signal injected into the control stage, the acceleration of the motor, and the slip of the wheels vary as a function of time.

With reference to FIG. 3, it is assumed that the apparatus is stabilized on the point A, the motor acceleration gama being zero.

In this stable state, the adhesion monitoring stage 22 causes the apparatus to be excited by causing the reference signal Cons to be varied so as to make the motor torque Cm greater than the transmitted torque (point A').

This modification causes an increase in the slip and makes the motor acceleration gama positive.

In response to this excitation, the stabilization stage 22C causes the value of the motor torque reference Cons to be corrected relatively so as to make the acceleration gama zero, thereby stabilizing the apparatus (point B).

In order to generate the next excitations, the adhesion monitoring stage 22 monitors the direction in which the motor torque Cm varies between the successive excitations so as to determine the sign of the activation signal C_Corr.

As shown in FIG. 3, for the activations corresponding to the points B', C', and D', the sign of the activation signal remains unchanged.

Conversely, on performing the next activation corresponding to the point E', the difference between the torques changes sign, thereby causing the activation signal C_Corr to change sign, and generating a relative decrease in the slip G and a change of sign of the acceleration gama of the motor 12. In response, the stabilization stage 22c causes the torque reference Cons to increase so as to stabilize the monitoring apparatus once again (point F).

It can thus be understood that the action of the adhesion monitoring stage 22 makes it possible to maintain the motor torque within a range of optimum values and to transmit to the driving wheels the maximum torque allowed by the available adhesion.

What is claimed is:

1. Monitoring apparatus for monitoring the adhesion of a motive power unit of an electric rail vehicle set, comprising:
 a power control stage for controlling the power supplied to a motor of the motive power unit,
 an adhesion monitoring stage for generating on the basis of at least first and second operating characteristics of the motor an activation signal so as to keep the slip of wheels of the motive power unit under control, and
 means for comparing the activation signal with a reference signal to generate a modified reference signal which is provided to the power control stage, wherein said adhesion monitoring stage including means for detecting the direction in which said second characteristic varies between two preceding successive activations so as to determine the sign of the activation signal to be compared with the reference signal on the next excitation of the motor.

2. Apparatus according to claim 1, wherein said activation signal is generated on the basis of a third operating characteristic of the motor, the adhesion monitoring stage includes comparator means for comparing the value of said third characteristic with a predetermined threshold value and means for determining an amplitude of said activation signal as a function of the result of said comparison.

3. Apparatus according to claim 1, wherein the reference signal is a motor torque reference signal.

4. Apparatus according to claim 1, wherein the first characteristic is generated on the basis of a measurement of an acceleration of the motor.

5. Apparatus according to claim 1, wherein the second characteristic is generated on the basis of a measurement of a motor torque.

6. Apparatus according to claim 2, wherein the third characteristic is generated on the basis of a measurement of an acceleration of the motor.

7. A control system for controlling the power supplied to a motor of a motive power unit of an electric rail vehicle set, said control system comprising:

a power supply circuit for supplying electrical power to the motor, an adhesion monitoring stage for generating on the basis of at least first and second operating characteristics of the motor an activation signal so as to keep the slip of wheels of the motive power unit under control, and means for comparing the activation signal with a reference signal to generate a modified reference signal which is provided to the power control stage, wherein said adhesion monitoring stage including means for detecting the direction in which said second characteristic varies between two preceding successive activations so as to determine the sign of the activation signal to be compared with the reference signal on the next excitation of the motor.

8. Apparatus according to claim 7, wherein said activation signal is generated on the basis of a third operating characteristic of the motor, the adhesion monitoring stage includes comparator means for comparing the value of said third characteristic with a predetermined threshold value and means for determining an amplitude of said activation signal as a function of the result of said comparison.

9. Apparatus according to claim 1, wherein said adhesion monitoring stage further comprises a stabilization stage for stabilizing said adhesion monitoring apparatus.

10. Apparatus according to claim 9, wherein said stabilization stage stabilizes said adhesion monitoring apparatus by correcting said reference signal.

* * * * *